UNITED STATES PATENT OFFICE.

CURTIS C. MEIGS, OF PHILADELPHIA, PENNSYLVANIA, ASSIGNOR TO ELECTRO-CHEMICAL SUPPLY & ENGINEERING COMPANY, OF PHILADELPHIA, PENNSYLVANIA, A CORPORATION OF PENNSYLVANIA.

MANUFACTURE OF ACID AND WATER PROOF CEMENT.

1,245,608.     Specification of Letters Patent.     Patented Nov. 6, 1917.

No Drawing.     Application filed July 12, 1915. Serial No. 39,369.

*To all whom it may concern:*

Be it known that I, CURTIS C. MEIGS, a citizen of the United States, residing in Philadelphia, Pennsylvania, have invented certain Improvements in the Manufacture of Acid and Water Proof Cement, of which the following is a specification.

My invention relates to that method of producing an acid and water proof cement which consists in mixing crystalline silica, such as ground quartz, diatomaceous earth, or the like, with sodium silicate, the object of my invention being to so prepare such a cement that subsequent exposure to water not only does not disintegrate or soften the cement but has the effect of hardening the same.

It has previously been proposed to produce a water and acid proof cement by adding to the silicious material an acid which would, on the later addition of sodium silicate, act as a precipitant of finely divided silica in the cement.

I have since found that the waterproof qualities of the cement can be materially enhanced by adding to the silicious material before the sodium silicate is added thereto, about ten (10) per cent. of apatite or pure calcium phosphate. The result of such addition is that the subsequent action of the acid results in the production of a cement which, when exposed to water, increases in hardness.

The action of the acid upon the calcium phosphate produces phosphoric acid, which reacts upon the silica-sodium silicate complex due to the combination of silica and sodium silicate in such a way as to form a mass which is impenetrable, insoluble, and inert in the presence of water without losing any of its acid-proof quality.

The reactions will be represented as follows:

I. $Ca_3(PO_4)_2 + 2H_2SO_4 = Ca(H_2PO_4)_2 + 2CaSO_4$
II. $2Ca(H_2PO_4)_2 + 2(Na_2O.3SiO_2) + 3SiO_2 + 2H_2O = 2CaO.2Na_2O.9SiO_2 + 4H_3PO_4$
III. $Ca_3(PO_4)_2 + 4H_3PO_4 = 3Ca(H_2PO_4)_2$
IV. $3Ca(H_2PO_4)_2 = Ca_3(PO_4)_2 + 4H_3PO_4$

The acid used is preferably one to which it is thereafter proposed to subject the structure made from the cement.

Instead of using calcium phosphate I may use calcium oxalate, which, when subjected to the action of sulfuric acid, will form oxalic acid, or I may use any neutral or acid salt, which, when brought into contact with the acid forms another acid, which will react upon the silica-sodium silicate complex in the manner described.

I claim:—

1. As an improvement in the manufacture of acid and water proof cement by mixing silicious material and sodium silicate, the mode herein described of increasing the water resisting property of the cement, said mode consisting in adding to the mixture of sodium silicate and silicious material an acid salt, and then subjecting the mixture to the action of an acid that will react upon the silica-sodium silicate complex.

2. As an improvement in the manufacture of acid and water proof cement by mixing silicious material and sodium silicate, the mode herein described of increasing the water resisting property of the cement, said mode consisting in adding to the mixture of sodium silicate and silicious material an acid salt, and then subjecting the mixture to the action of an acid that will form an acid having said salt as a base for reaction upon the silica-sodium silicate complex.

3. As an improvement in the manufacture of acid and water proof cement by mixing silicious material and sodium silicate, the mode herein described of increasing the water resisting property of the cement, said mode consisting in adding calcium phosphate to the silicious material and sodium silicate, and subsequently subjecting the mixture to the action of an acid that will produce phosphoric acid for reaction upon the silica-sodium silicate complex.

In testimony whereof, I have signed my name to this specification, in the presence of two subscribing witnesses.

CURTIS C. MEIGS.

Witnesses:
KATE A. BEADLE,
HAMILTON D. TURNER.

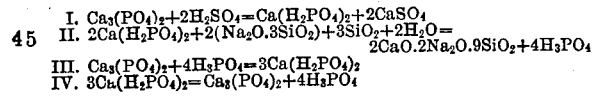

Copies of this patent may be obtained for five cents each, by addressing the "Commissioner of Patents, Washington, D. C."